INVENTOR:
JOHN W. HUFFMAN
BY
Harry O. Ernsberger
ATTORNEY

Sept. 28, 1965 J. W. HUFFMAN 3,209,106

THERMORESPONSIVE SWITCH FOR ELECTRICALLY ENERGIZABLE SURFACE HEATER

Filed Feb. 24, 1961 4 Sheets-Sheet 2

INVENTOR:
JOHN W. HUFFMAN
BY
Harry O. Ernsberger
ATTORNEY

INVENTOR:
JOHN W. HUFFMAN.
BY
Harry O. Ernsberger
ATTORNEY

Sept. 28, 1965 J. W. HUFFMAN 3,209,106
THERMORESPONSIVE SWITCH FOR ELECTRICALLY
ENERGIZABLE SURFACE HEATER
Filed Feb. 24, 1961 4 Sheets-Sheet 4

INVENTOR:
JOHN W. HUFFMAN.
BY
Harry O. Ernsberger
ATTORNEY

United States Patent Office 3,209,106
Patented Sept. 28, 1965

3,209,106
THERMORESPONSIVE SWITCH FOR ELECTRICALLY ENERGIZABLE SURFACE HEATER

John W. Huffman, Mansfield, Ohio, assignor to Pace, Inc., Mansfield, Ohio, a corporation of Ohio Filed Feb. 24, 1961, Ser. No. 91,463
7 Claims. (Cl. 200—137)

The invention relates to thermoresponsive control apparatus for electrically energizable surface heaters and more especially to a thermoresponsive control for the electrically energizable open heating units or surface units of a cooking range especially adapted for controlling the application of heat to the contents of a cooking receptacle which is in heat conducting relation with the heating unit.

The invention embraces the provision of a thermoresponsive circuit controlling means for a so-called electrically energizable "top burner" or surface heater of a cooking range which occupies but a small space centrally of the heating element and which is adjustable for varying the temperature range within which it is desired to maintain the cooking receptacle and contents.

The invention has for an object the provision of thermoresponsive control apparatus for a surface heater of a cooking range embodying a thermoresponsive heat transferring member engagable with a cooking receptacle whereby the expansion and contraction of the member actuates switch means in the electrical circuit of the surface heater and eliminating the use of bimetallic elements providing a compact control which is simple and reliable in operation.

Another object of the invention resides in the provision of a thermoresponsive control for a surface heating unit of a cooking range embodying a resiliently biased heat responsive member in heat transferring relation with a cooking receptacle supported by the heating unit whereby an efficient and accurate control of the temperature or application of heat to the contents of the receptacle is assured through direct actuation of the control switch by the heat transferred to the heat responsive member from the cooking receptacle.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which.

The invention has particular utility for controlling the flow of electric current to a surface heater of a cooking range wherein heat from the heater is transferred to a cooking receptacle and heat from the receptacle transferred to a plate or disc having a high coefficient of expansion and contraction, the expansion and contraction being utilized to actuate switch means or mechanism intercalated in the circuit of the heater.

Figure 1:
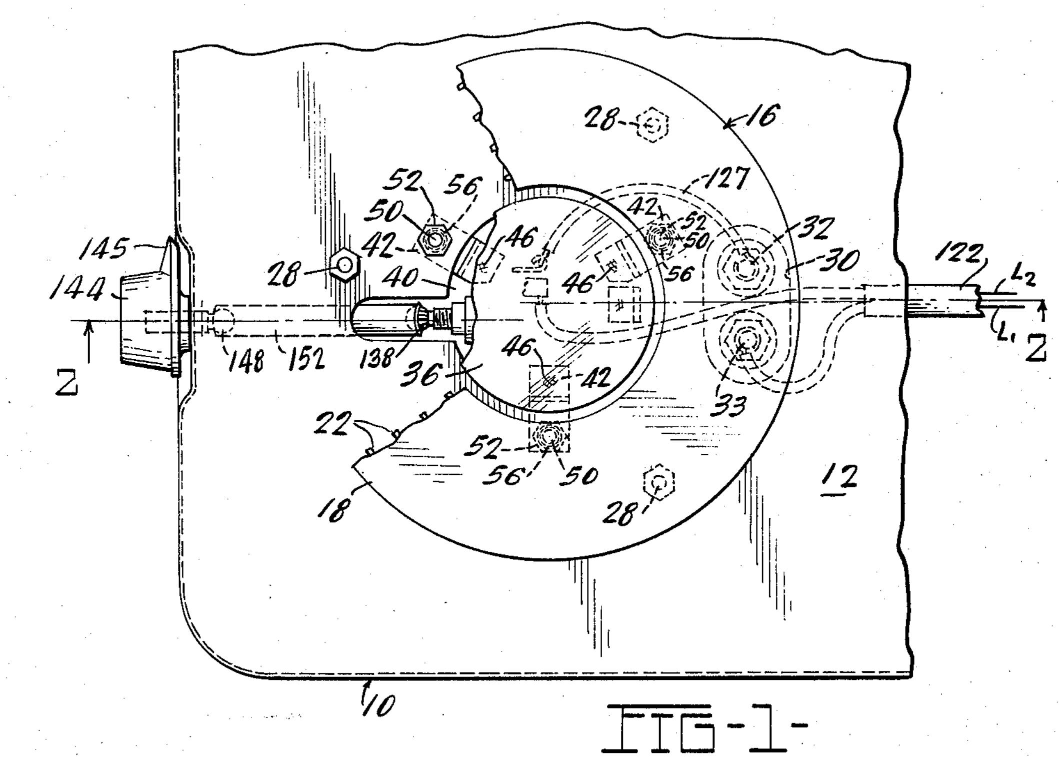
FIGURE 1 is a top plan view of a portion of a cooking range having a surface heating or cooking unit embodying a form of apparatus of the invention.
Figure 2:
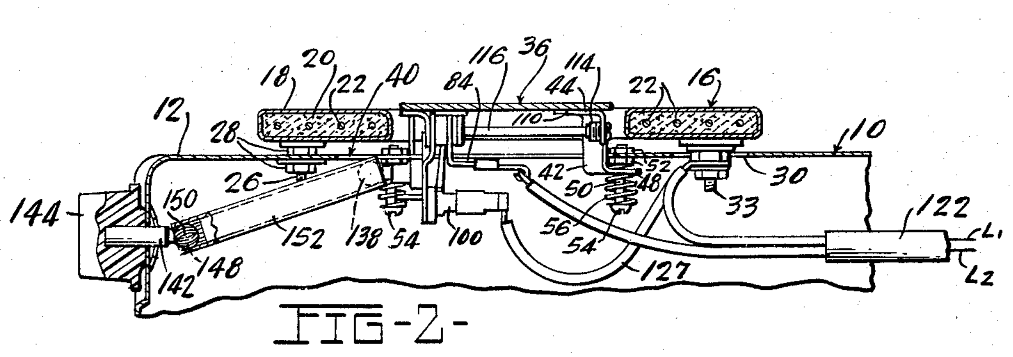
FIGURE 2 is a sectional view taken substantially on line 2—2 of FIGURE 1.
Figure 3:
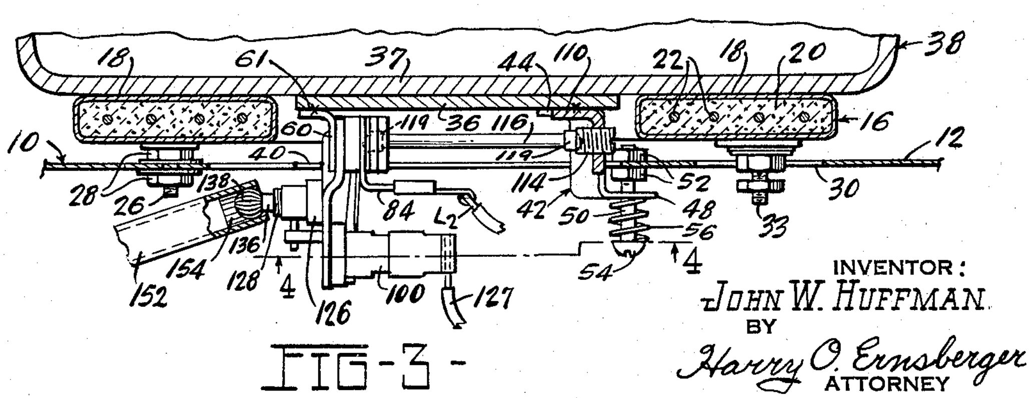
FIGURE 3 is an enlarged view of a portion of the construction shown in FIGURE 2 illustrating a portion of a cooking receptacle in position on the heating element.

Referring to the drawings in detail, FIGURES 1 through 3 illustrate a portion of a stove or cooking range 10 formed of sheet metal having a planar upper surface 12 which may be coated with porcelain or other suitable heat resistant coating. In the embodiment illustrated, the planar portion 12 supports an electrically energizable surface heating or cooking unit 16 of annular configuration. The heating unit 16 is inclusive of an annular metal casing or housing 18 containing refractory or other suitable insulating material 20 in which is embedded a spirally shaped current conductor 22 having a high resistance and through which electrical energy flows to generate heat.

The casing 18 of the annularly shaped heater 16 is secured to the upper planar portion 12 of the range by means of bolts 26 and securing nuts 28, there being three bolts illustrated in FIGURE 1 spaced circumferentially of the heater 16. The upper planar portion 12 of the range is provided with an opening 30 to accommodate circuit connections or terminal bolts 32 and 33 accommodating current conductors as hereinafter described.

The control apparatus of the invention is inclusive of a heat transfer member or plate 36 which is adapted to be engaged by the bottom portion 37 of a cooking receptable 38 when placed upon the surface heating unit 16 in the manner illustrated in FIGURE 3. The switch mechanism and associated components are supported or mounted by the plate 36 and the latter is resiliently biased to a position normally slightly above the upper planar surface of the casing 18 of the annularly shaped heater 16 so that the plate is in intimate heat transferring relation with the lower surface of the bottom wall 37 of the cooking receptacle 38.

The portion 12 of the cooking range is provided with a circular opening 40 to accommodate the switch means of the construction. The supporting means for the circular heat transfer plate 36 is inclusive of three generally Z-shaped brackets 42, the upper horizontal portion 44 of each bracket 42 being welded by spot welding as indicated at 46 or otherwise fixedly secured to the plate 36. The web portions of the brackets 42 depend from the plate 36 and the lower horizontal projections 48 of the brackets extend outwardly as shown in FIGURES 1, 2 and 3. The brackets 42 are preferably spaced equal distances apart circumferentially on the plate 36.

The surface portion or area 12 of the cooking range is provided with openings accommodating bolts 50, the bolts extending through registering openings formed in the lower horizontal projections or portions 48 of the brackets 42, the bolts being secured to the portion 12 by pairs of nuts 52.

Each of the bolts 50 is provided with a head 54 and an expansive coil spring 56 is disposed between the head 54 of each bolt and the projection 48 of each bracket 42 as particularly illustrated in FIGURES 2 and 3.

The bolts 50 are adjusted through manipulation of the securing nuts 52 so that the expansive pressure of the spring 50 normally maintains the upper planar surface of the heat transfer plate 36 slightly above the upper planar surface of the annular heater casing 18 as shown in FIGURE 2. Through this arrangement, the cooking receptacle 38 engages the heating unit 16 and the heat transfer plate 36, depressing the plate 36 by compressing the springs 56 so that, during use, the upper surfaces of the heat transfer plate 36 and the heating unit casing are in a common plane in contact with the bottom wall 39 of the cooking receptacle, as shown in FIGURE 3.

Figure 4:
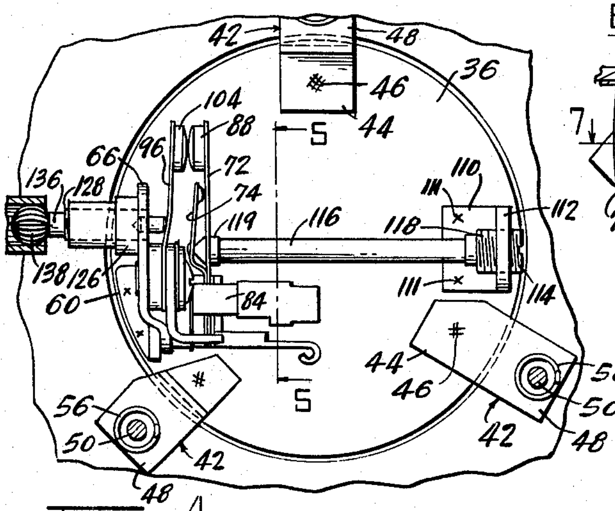
FIGURE 4 is a bottom plan view of the thermoresponsive control apparatus shown in FIGURES 1 through 3.
Figure 5:
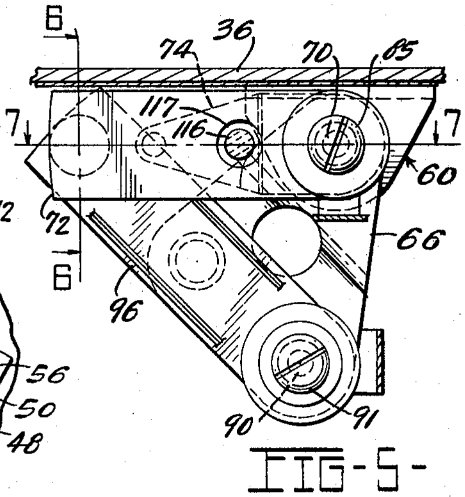
FIGURE 5 is an enlarged sectional view taken substantially on the line 5—5 of FIGURE 4.
Figure 8:
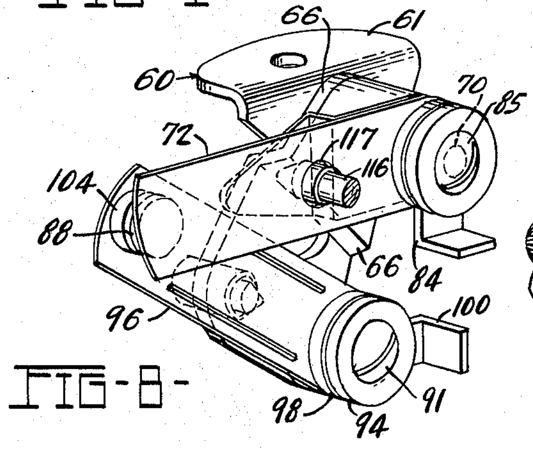
FIGURE 8 is an isometric view illustrating the switch construction of the control arrangement of the invention.

The switch means of the control arrangement is particularly illustrated in FIGURES 2 through 8. The switch means is inclusive of an L-shaped bracket or support having a horizontal portion 61 welded or otherwise secured near an edge region of the heat transfer plate 36. The bracket 60 may also be further secured to the heat transfer plate by means of a rivet 62 shown in FIGURE 6. The L-shaped bracket 60 provides a mounting means for a base plate or support 66 which is of generally triangular shape as shown in FIGURES 5 and 8. An insulating member 69 of mica or the like is disposed coextensive with the plate 36 and between the plate and components of the switch means. The plate 66 is provided with an opening accommodating a bolt 70 particularly shown in FIGURE 7.

Figures 7, 9:
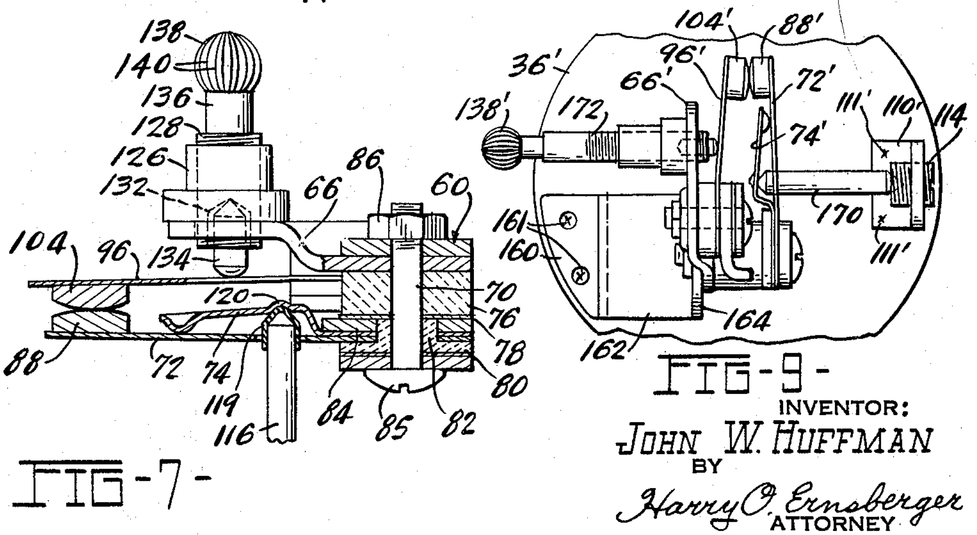
FIGURE 7 is a detail sectional view taken substantially on the line 7—7 of FIGURE 5.
FIGURE 9 is a view similar to FIGURE 4 illustrating a modified form of control apparatus of the invention.

The bolt 70 provides a support means for a switch arm 72 and a switch arm tension member or actuator 74. Assembled on the bolt 70 is an insulating spacer or member 76 preferably of insulating material and a disc 78 of mica or other suitable insulating material. Arranged adjacent the mica disc 78 is a member or washer 80 of insulating material having a tenon portion 82. Mounted upon the tenon portion 82 is a terminal or connector 84, the switch arm or member 72 and the switch arm tension member 74, the components 72 and 74 having circular openings to receive the tenon portion 82 as shown in FIGURE 7.

A metal washer 84 is disposed between the insulating member 80 and the head 85 of the bolt 70. A nut 86 is threaded onto the threaded portion of the bolt 70 and is drawn up to secure and maintain the components 72 and 74 in the relationship illustrated in FIGURE 7. The switch arm 72 is provided with a contact 88. The depending portion of the triangularly shaped support member 66 is provided with an opening accommodating a bolt 90 having a head portion 91. Mounted upon the bolt 90 are discs or washers 93 and 94 between which is mounted a second switch arm or member 96 which is insulated from the bolt 91 by the insulating members 93 and 94.

A circular metal member 98 in contact with the switch member 96 is provided with a terminal or projection 100 to accommodate a circuit connection. A washer 102 of insulating material, as for example, mica insulates the metal washer 94 from the terminal 100. The switch arm 96 is provided with a contact 104 which cooperates with the contact 88 to complete or interrupt a circuit through the resistance element 22 of the heating unit 16.

It should be noted from FIGURES 5 and 8 that the switch arms 72 and 96 are angularly and convergingly arranged in order to reduce the depth or vertical dimension of the switch mechanism to a minimum so as to provide a compact construction as exemplified in FIGURES 2 and 3. Welded or otherwise secured to a peripheral region of the heat transfer plate 36 substantially diametrically opposite the switch support bracket 60 is an L-shaped bracket 110, the welding being indicated at 111. The depending leg 112 of the L-shaped bracket 110 is bored and threaded to accommodate a threaded member or screw 114 as particularly shown in FIGURES 2, 3 and 4.

Disposed between the threaded member 114 and the switch arm tensioning member 74 is a strut or rod 116 formed of lava, ceramic or other rigid insulating material which has an extremely low coefficient of expansion and contraction. The extremities of the strut 116 are preferably provided with metal cap members 118 and 119 having cone-shaped extremities, the cap member 118 engaging in a recess in the threaded member 114, and the cap member 119 engaging in a depression 120 formed in the switch arm tensioning member 74. The switch arm 72 is formed with a clearance opening to accommodate the cap member 119. The cap members 118 and 119 may be fashioned of stainless steel or other suitable material having long wearing characteristics.

The heat transfer plate 36 is made of aluminum, stainless steel or other suitable metal having a substantially high coefficient of expansion and contraction and this plate forms the thermoresponsive component or element of the circuit controlling switch mechanism.

The switch mechanism is in series with the resistance heating element 22 and the circuit connections therefore are illustrated in FIGURES 1 and 2. The current supply conductors which are adapted to be connected with a conventional source of electric current are designated L1 and L2 and are enclosed in a sheath 122 of insulating material.

The conductor L2 is connected with the terminal 84 of the switch mechanism. The conductor L1 is connected with the terminal 33 which is connected with one end of the electrically energizable heating or resistance unit 22. The other end of the resistance unit 22 is connected with the terminal 32 and the latter connected with the terminal 100 of the switch mechanism by a conductor 127. When the contacts 88 and 104 are in engagement, a circuit is completed with the current supply conductors L1 and L2 through the heating or resistance unit 22 generating heat for cooking purposes. When the contacts 88 and 104 are disengaged, the circuit is interrupted.

Means is provided for manually adjusting the relative position of the switch arm 96 in order to regulate the temperature at which the cooking receptacle and comestible contents are to be maintained. Welded or otherwise secured to the support bracket or means 66 is a member 126 which is interiorly bored and threaded to accommodate a threaded member 128. One end of the member 128 is formed with a socket or recess 130 to accommodate a strut 134 which is formed of suitable insulating material, as for example, lava or other high temperature resistant material.

Figure 6:
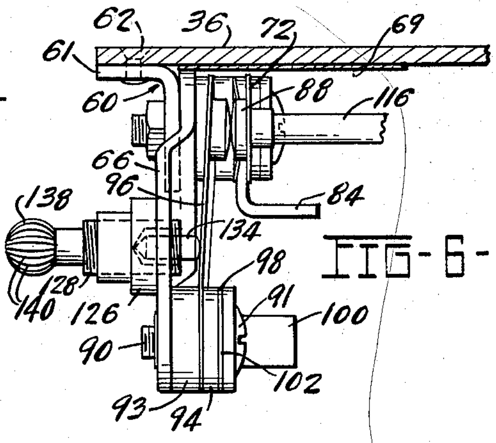
FIGURE 6 is a detail sectional view taken substantially on the line 6—6 of FIGURE 5.

One end of the strut 134 engages the switch arm 96 as shown in FIGURES 6 and 7. Thus, rotation of the threaded member 128 relative to the member 126, through the medium of the strut 134 controls or regulates the relative position of the switch arm 96 to thereby determine the relative adjusted position of the contact 104. The member 128 is provided with a tenon 136 and extending from the tenon 136 and integral therewith is a ball-shaped portion 138 formed with peripherally spaced grooves or serrations 140.

Journally supported in a wall of the range housing 10 is a pin 142 provided with a manipulating knob 144 formed with an index 145 which is adapted for cooperation with graduations of conventional character provided on the adjacent region of the wall of the housing 10 adjacent the knob and calibrated to indicate cooking temperatures. The pin 142 is integrally provided with a ball-shaped portion 148 of the same configuration as the ball-shaped portion 138 and is provided with peripherally spaced grooves or serrations 150 of the same character as the grooves 140 on the portion 138.

Arranged between and connecting the ball-shaped portions 138 and 148 is a hollow or tubular member 152, the interior end regions being provided with circumferentially spaced recesses 154 forming teeth which enmesh in the recesses, grooves or serrations 140 and 150 formed in the ball-shaped portions 138 and 148 respectively. This arrangement provides an articulate connecting means capable of limited universal movement for adjusting the switch member 96 by manipulation of the knob 144.

Thus rotation of the knob 144 through the medium of the tubular connection 152 effects corresponding rotational movements of the member 128 to adjust the relative position of the switch arm 96 and hence the contact 104. It should be noted that the components of the switch mechanism are secured to or carried by the heat transfer plate 36 and the latter in turn resiliently supported by the springs 56.

The use and operation of the switch mechanism in controlling the temperature of a cooking receptacle and its comestible contents is as follows: The heat transfer plate 36, under the influence of the expansive coil springs 56, is normally slightly elevated above the planar surface of the heater casing 18 of the resistance unit 22, as shown in FIGURE 2.

A cooking receptacle 38 and its comestible contents, when positioned upon the heating unit or resistance unit 22, engages the heat transfer plate 36 and, due to the weight of the cooking receptacle and its contents, the heat transfer plate is depressed and components carried thereby moved to a position as shown in FIGURE 3 wherein the upper surface of the heat transfer plate is in the same plane as the upper surface of the heating unit 16. Under the bias or influence of the expansive pressure of springs 56, the heat transfer plate 36 is resiliently maintained in intimate heat transferring relation with the lower surface of the bottom 37 of the cooking receptacle 38.

The manually operable knob 144 is adjusted to a position to provide a desired temperature for the cooking receptacle, and the contact 104 is thereby adjusted to a particular relative static position. When the heat transfer plate 36 is at normal or room temperature, viz. in its thermally contracted position, the strut 116 exerting a bias in a left-hand direction as viewed in FIGURE 4 maintains the switch member tensioning means 74 in a position whereby the inherent stress in the switch member 72 holds the contact 88 in engagement with the contact 104 to complete the circuit energizing the resistance heating unit 22.

As the cooking receptacle becomes heated, the heat is transferred by conduction to the plate 36, which, being of metal having a comparatively high coefficient of expansion, is expanded and, as there is substantially no expansion of the lava strut 116 the expansion of the transfer plate 36 elongates the distance between the bracket 112 and the switch support or bracket 66 so that the lava strut 116 is moved slightly in a right-hand direction of its length, as viewed in FIGURE 4, to reduce the bias upon the switch tensioning member 74, the latter reacting against the switch arm 72 moves the contact 88 in a right-hand direction away from the contact 104.

When the cooking receptacle and its contents have attained the temperature for which the knob 144 has been adjusted, the heat transfer plate 36 is expanded to an extent that the contact 88 is separated from the contact 104 and the flow of current through the resistance heating element 22 is interrupted.

As the temperature of the cooking receptacle 38 and its contents is reduced or cooled by reason of interruption of the application of heat, the cooling or reduction in temperature of the heat transfer plate 36 results in its contraction.

Such contractive movement is transferred by the lava strut 116 to the switch arm tensioning member 74 to facilitate or permit flexing movement of the switch arm 72 in a direction to reengage the contact 88 with the contact 104 and effect resumption of current flow to the resistance heater or unit 22. It should be noted that the brackets 60 and 110 are disposed at substantially diametrically opposed positions on the circular heat transfer plate 36 adjacent the peripheral regions of the plate so as to obtain the benefit of the maximum expansion and contraction of the heat transfer plate 36 effective to control the switch arm 72 through the medium of the lava strut 116.

As the cooking receptacle is again increased in temperature under the influence of heat generated by the heating unit or resistance 22 when the switch contacts are closed, the heat transfer plate 36 is again expanded, separating the contact 88 from the contact 104 to interrupt current flow to the heating unit 22. Through this repeated cycling action, the cooking receptacle 38 and its contents are maintained at a substantially constant temperature for which the manually controlled knob 144 is adjusted.

If it is desired to increase the cooking temperature, the knob 144 is readjusted to the temperature desired and the cooking receptacle and contents thereof will be thereafter maintained substantially at the temperature selected by positioning the knob 144. The tubular connection 152 between the manipulating means 144 and the member 128 facilitates the relative vertical adjustment or movement of the switch mechanism and the transfer plate under the influence of the cooking receptacle 38.

FIGURE 9 illustrates a modified arrangement of the assembly of the switch mechanism and the heat transfer plate whereby the switch mechanism is disposed more centrally of the heat transfer plate. Secured to the heat transfer plate 36' is a bracket 160 similar to the bracket 60 but having an offset horizontal portion 162 of substantial length. The switch supporting means 66' is secured to a transversely extending portion 164 of the support or bracket 160, the bracket 160 being welded at the regions 161 to the heat transfer plate 36'.

The bracket 110' is secured by welding 111' to the heat transfer plate and supports the threaded member 114'. The switch assembly comprising the switch arms 72' and 96', the switch arm tensioning member 74', the contacts 88' and 104' and the mounting arrangement for the switch arms are the same as the corresponding components shown in the form of the invention illustrated in FIGURES 1 through 8. Disposed between the switch arm tensioning member 74' and the threaded member 114' is a strut 170 formed of lava or other suitable insulating material which has an extremely low coefficient of expansion and contraction.

The arrangement shown in FIGURE 9 operates or functions in substantially the same manner as the arrangement shown in the form of the invention illustrated in FIGURES 1 through 8. Upon expansion of the heat transfer plate 36', the expansive movement is transferred to the switch tensioning or stressing member 74' to modify the position of the contact 88' with respect to the contact 104' and thereby control the circuit through the heating unit. As the support 160 is fashioned of Invar metal, the full diametrical dimension of the heat transfer plate 36' is effective to modify the position of the switch stress member 74' and hence the switch member 72' to attain accurate temperature control of the cooking receptacle and its contents.

The switch arm 96' is controlled by a member 172 which is connected with the manipulating means illustrated in FIGURES 1 through 3 in the same manner as hereinbefore described in reference to the form of the invention shown in FIGURES 1 through 8. The member 172 is provided with a serrated or grooved ball-shaped portion 138' which is engaged by a tube similar to the tube 152' which is connected with an adjsutable control knob of the character shown in FIGURES 1 and 2.

FIGURES 10 through 13 illustrate another form of control apparatus of the invention. This arrangement includes the heat transfer member or plate 36'' which is adapted to be engaged by the bottom of a cooking receptacle when placed upon the surface heating unit as shown in FIGURE 1. Secured to the plate 36'' by means of rivets 180 is an L-shaped bracket 181, a sheet of mica 182 being secured adjacent the lower surface of the plate 36'' which is held in place by the rivets 180.

The L-shaped bracket 181 supports the stacked switch blade construction which includes a bolt 184, insulating washers 185, 186 and 187 of lava, ceramic or other suitable insulating material, and circuit connectors or terminals 188 and 189. Insulatingly supported by the members 185, 186 and 187 are switch blades 190 and 191 provided respectively with contacts 192 and 193 which control an energizing electric circuit through the surface heating element of the character illustrated in FIGURES 1 through 3.

A switch arm tension member 195 is supported by the insulating members 186 and 187 and extends in substantial parallelism with the switch arm 191, the member 195 normally stressing or biasing the arm 191 to a predetermined position. Secured to the L-shaped member 181 is a bushing 197 which is interiorly threaded to accommodate an adjusting shaft or member 199. The adjusting shaft 199 is provided with a recess accommodating a strut 200 of lava or other suitable insulating material, one end of which engages the switch arm 190. The shaft or adjusting member 199 may be connected with manipulating means such as that illustrated in FIGURES 1 through 3 for adjusting the relative position of the switch arm 190.

Also secured to the heat transfer plate 36'' by means of rivets 204 is a second L-shaped member 206. The member 206 is formed with a threaded opening to accommodate an adjustable threaded member 208 provided with a kerf 209 to receive a suitable tool for adjusting the relative position of the threaded member 208. As particularly shown in FIGURES 10 and 13 the switch arm tension member 195 is formed with a recess 210.

Disposed between the threaded member 208 and the switch arm tension member 195 is a strut or bar 212 formed of lava, ceramic or other suitable rigid insulating material. The end regions of the ceramic or laval strut 212 are provided with metal caps 214 and 216 which engage respectively in the recess 210 of the switch arm tension member 195 and a recess in the threaded member 208. The L-shaped member 181 is made of Invar metal or other metal which has a comparatively low coefficient of expansion while the heat transfer plate 36'' is made of aluminum or other metal having a comparatively high coefficient of expansion and contraction.

The operation of the arrangement shown in FIGURES 10 through 13 is similar to the arrangement shown in FIGURES 1 through 8. As the L-shaped member 181 and the L-shaped member 206 are secured at diametrically opposed edge regions of the heat transfer plate 36'', expansion and contraction of the heat transfer plate effects relative movement between the L-shaped members 181 and 206 and through the strut 212, movement is imparted to the switch arm tension member 195 for shifting the relative position of switch arm 191 to make or interrupt the circuit of the surface heating unit through engagement and disengagement of the contacts 192 and 193.

Figures 10, 11, 12, 13:
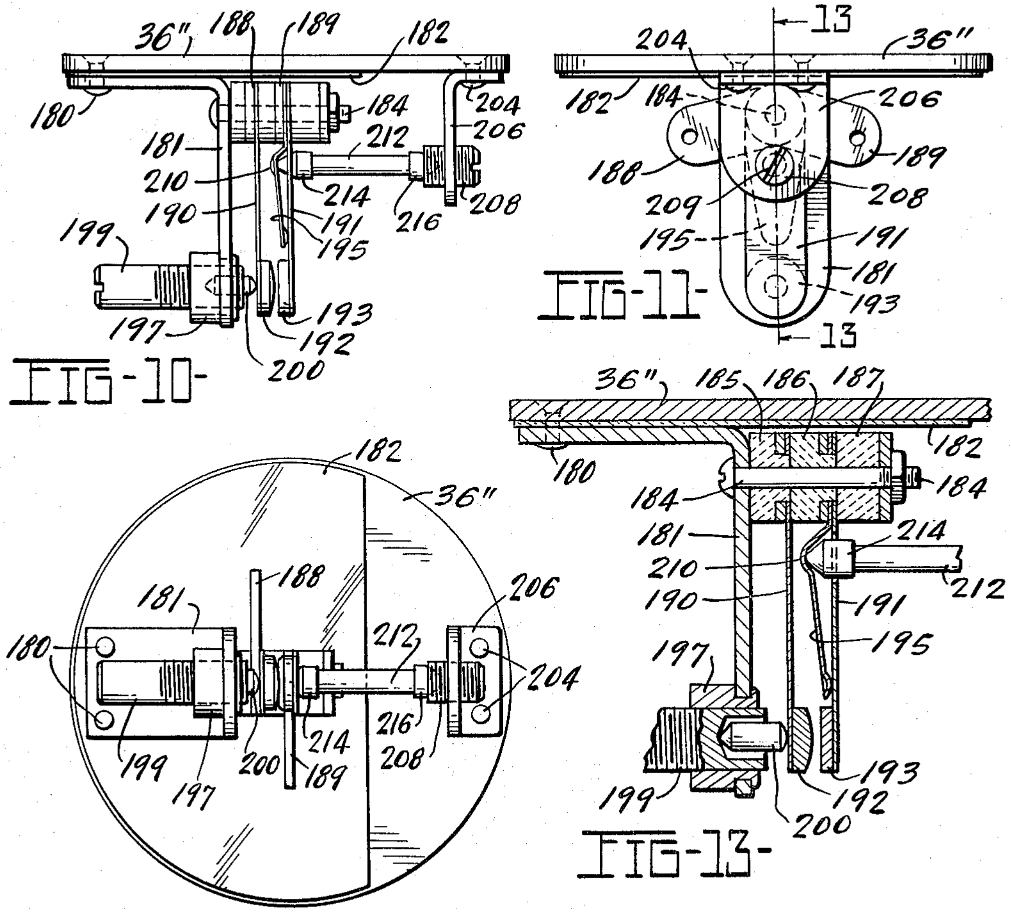
FIGURE 10 is an elevational view illustrating another form of control apparatus of the invention.
FIGURE 11 is an end elevational view of the structure shown in FIGURE 10.
FIGURE 12 is a bottom plan view of the structure shown in FIGURE 10.
FIGURE 13 is a sectional view taken substantially on the line 13—13 of FIGURE 11.

When the heat transfer plate 36'' is substantially cold and is at its normal contracted position, for example, at room temperature, the strut 212 holds or biases the switch arm tension member 195 in a left-hand direction as viewed in FIGURES 10 and 13 permitting the switch member 191 to pivot or move in a left-hand direction to engage contact 193 with contact 192.

As the temperature of heat transfer plate 36'' is increased during cooking operations, the plate 36'' expands in the direction of its major planar surfaces, moving the L-shaped bracket 206 away from the bracket 181 and the strut member 212 in a right-hand direction which permits the switch arm tension member 195 to exert bias upon the switch member 191 in a right-hand direction to move the contact 193 out of engagement with the contact 192 interrupting the circuit through the surface heating unit.

The shaft 199 is manually adjustable by a knob such as the knob 144 shown in FIGURES 1 and 2 for adjusting the relative position of the switch arm 190 and thereby predetermine a position for the contact 192 for the temperature at which it is desired to maintain in the cooking receptacle. When the temperature of the bottom wall of the cooking receptacle is reduced or cooled through interruption of current flow through the surface heating unit, the heat transfer plate 36'' contracts and, through the strut 212, the switch arm 191 moves in a left-hand direction as viewed in FIGURE 10 to re-engage the contacts 192 and 193 to reestablish current flow through the surface heating unit. It this manner the temperature of the cooking receptacle is controlled automatically for the temperature at which the switch arm 190 is adjusted by manual adjustment of the shaft 199.

Figure 14:
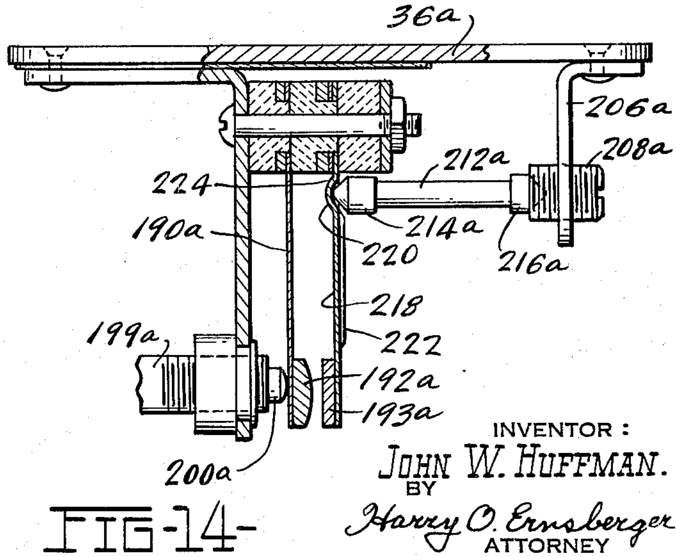
FIGURE 14 is a sectional view similar to FIGURE 13 illustrating a modified form of apparatus of the invention.

The arrangement illustrated in FIGURE 14 is similar to that illustrated in FIGURES 10 through 13. In this form, the strut member **212*a*, supported by the threaded member 208*a* mounted by a bracket 206*a* carried by the heat transfer plate 36*a*, is engaged with the switch arm 218, the latter being directly actuated or controlled by the sturt 212*a*. The switch arm 218 is provided with a recess 220 which receives the cap 214*a* on one end of the strut member 212*a* for effecting relative movement of the switch arm 218 under the influence of expansion and contraction of the heat transfer plate 36*a*** under temperature variations.

The switch arm 218 is provided with a contact **193*a* which cooperates with a contact 192*a* carried by the manually adjustable switch arm 190*a* to make or interrupt the circuit through the surface heating element through expansion and contraction of the heat transfer plate 36*a*. The switch arm 218 is preferably fashioned with a raised longitudinally-extending rib 222 between the contact 193*a* and the region of the recess 220 to assure flexure or pivotal movement of the switch arm 218 about the region indicated at 224 adjacent its support. Through the provision of the strengthening rib 222, appreciable deflection of the portion of the switch arm between contact 193*a* and the recess 220** is prevented or avoided.

The operation of the form shown in FIGURE 14 is substantially the same as the operation of the arrangement shown in FIGURES 10 through 13 except that deflection of the switch arm **191*a* is attained through direct engagement with the strut 212*a* through the metal cap member 214*a*. The proper position of the strut member and switch member may be controlled by adjustment of the threaded member 208*a* relative to the bracket 206*a***.

Figure 15:
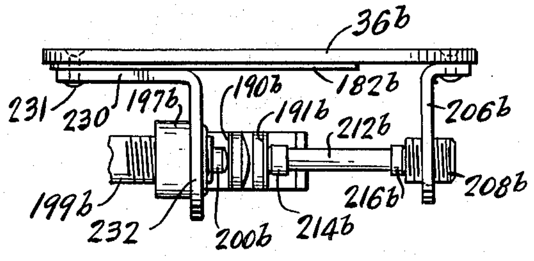
FIGURE 15 is an elevational view of still another form of apparatus of the invention.
Figure 16:
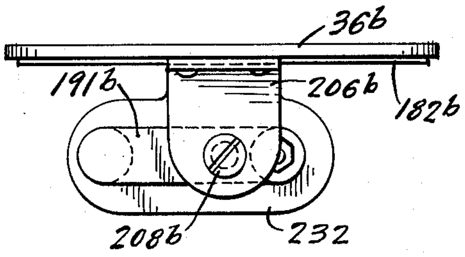
FIGURE 16 is an end view of the structure shown in FIGURE 15.
Figure 17:
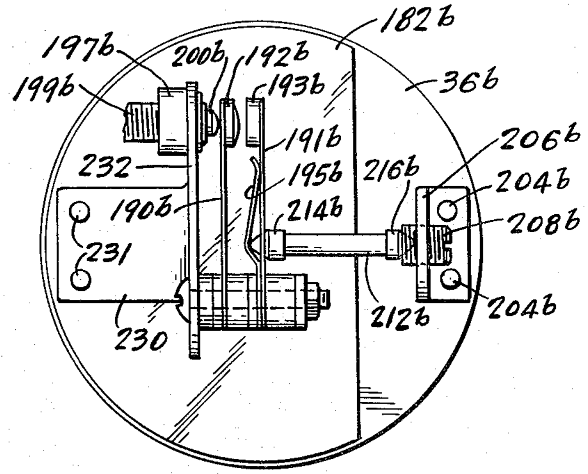
FIGURE 17 is a bottom plan view of the structure shown in FIGURE 15.

Another modified form of the invention is illustrated in FIGURES 15 through 17. In this form of construction the switch members are positioned close to the heat transfer plate. In this form an L-shaped bracket 230 is secured by means of rivets 231 to the heat transfer plate **36*b*, the depending portion 232 of bracket 230 being elongated in parallelism with the heat transfer plate 36*b* and is of a configuration as particularly shown in FIGURE 16. The switch blades or members 190*b* and 191*b* are arranged substantially in parallelism with the elongated portion 232 of the bracket 230**.

The switch members **190*b* and 191*b* and the switch arm tension member 195*b* are supported by the portion 232 of the L-shaped bracket 230 in the same manner as illustrated in FIGURES 10 through 13. A second L-shaped bracket 206*b*, secured by rivets 204*b* to the heat transfer plate 36*b* at a region diametrically opposite the rivets 231 and at the edge region of the heat transfer plate, provides support for the threaded member 208*b*. A strut member 212*b* of insulating material, provided with end caps 214*b* and 216*b***, is disposed between the member

208*b* and the switch arm tension member 195*b* as particularly shown in FIGURE 17.

In this form the components of the switch construction are disposed adjacent the heat transfer plate 36*b* reducing the vertical space beneath the plate 36*b* to accommodate the switch construction.

The switch arms are respectively provided with the contacts 192*b* and 193*b* which control the circuit of a surface heating unit of the character shown in FIGURES 1 through 3. Adjustment of the switch arm 190*b* is effected through the medium of the adjustable shaft 199*b* threaded into a bushing 197*b* secured to the elongated portion 232 of the L-shaped bracket 230.

A lava strut 200*b* is disposed between the switch arm 190*b* and a recess in the end of the shaft 199*b*. The L-shaped bracket 230 is formed of Invar metal having a low coefficient of expansion, and the heat transfer plate 36*b* is of aluminum or other metal having a comparatively high coefficient of expansion in order to effect substantial movement of the switch arm 191*b* under variations in temperature of the bottom of a cooking receptacle engaged with the heat transfer plate 36*b*.

Figure 18:
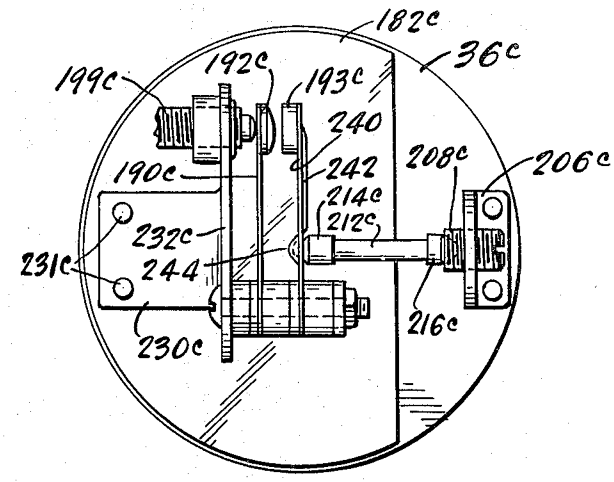
FIGURE 18 is a view similar to FIGURE 17 showing another form of apparatus of the invention.

The arrangement shown in the modification of FIGURE 18 is similar to that shown in FIGURES 15 through 17. In this form, the bracket 230*c* and the bracket 206*c*, are secured to the heat transfer plate in the manner as shown in FIGURE 17. The switch arm 190*c* carrying a contact 192*c* is mounted in the same manner as the switch member 190*b*, shown in FIGURE 17, and its relative position controlled by manual adjustment of the shaft 199*c*.

The switch arm 240 is similar to the switch arm 218, shown in FIGURE 14, the same being fashioned with a longitudinally-extending reinforcing rib 242, the arm 240 carrying a contact 193*c* for cooperation with the contact 192*c*.

The arm 240 is formed with a depression or recessed portion 244 adapted to be engaged by the cap 214*c* on the end of the strut 212*c*, the latter being of lava or other heat resistant insulating material.

The other end of the strut 212*c* is provided with a metal cap 216*c* engaging in a recess in the adjustable threaded member 208*c*. The bracket 230*c* is configurated with the elongated portion 232*c* extending in parallelism with the heat transfer plate 36*c* in the same manner as the form illustrated in FIGURE 16 so as to position the switch arms 190*c* and 240 in substantial parallelism with the elongated portion 232*c* of the bracket 230*c* in close proximity to the heat transfer plate 36*c*.

The operation of the arrangement shown in FIGURE 18 is substantially the same as that shown in FIGURES 15 through 17 except that the strut 212*c* directly controls the position of the switch arm 240.

It is apparent that, within the scope of the invention, modifications and different arrangements may be made other than as herein disclosed, and the present disclosure is illustrative merely, the invention comprehending all variations thereof.

I claim:

1. Control apparatus for an electrically energizable surface heating element for a cooking range wherein the heating element is shaped to define an open central area including, in combination, a metal plate disposed in the open central area of the heating element, switch means disposed adjacent the metal plate, resilient means normally supporting said plate above the plane of the upper surface of the heating element, said switch means including a support secured to the metal plate, said switch means including a first switch arm and a second switch arm mounted by the support and adapted to be connected in the circuit of the heating element, said switch arms having cooperating contacts adapted for engagement to complete a circuit through the heating element, a switch arm biasing member mounted by the support engaging the second switch arm and normally biasing the said second switch arm in a direction to disengage the contacts strut means of material having a coefficient of expansion less than the coefficient of expansion of the metal plate, bracket means spaced from the switch means joined with said metal plate, said strut means being disposed between and engaging the bracket means and the switch arm biasing means whereby expansion and contraction of said plate by temperature variations is transmitted by the switch arm biasing means to the second switch arm, and manually operable means mounted by the support and engaging the first switch arm for varying the relative position of the first switch arm.

2. Control apparatus for an electrically energizable surface heating element for a cooking range wherein the heating element is shaped to define an open central area including, in combination, a metal plate disposed in the open central area of the heating element, resilient means normally supporting said plate above the plane of the upper surface of the heating element, switch means disposed adjacent the metal plate, said switch means including a support secured to the metal plate, said switch means including a first switch arm and a second switch arm mounted by the support and adapted to be connected in the circuit of the heating element, said switch arms having cooperating contacts adapted for engagement to complete a circuit through the heating element, a switch arm biasing member mounted by the support engaging the second switch arm and normally biasing the said second switch arm in a direction to disengage the contacts, strut means of material having a coefficient of expansion less than the coefficient of expansion of the metal plate, bracket means spaced from the switch means joined with said metal plate, said strut means being disposed between and engaging the bracket means and the switch arm biasing means whereby expansion and contraction of said plate by temperature variations effects movement of the switch arm biasing means to vary the position of the second switch arm, and manually operable means engaging the first switch arm for adjusting the relative position of said first switch arm.

3. Control apparatus for an electrically energizable heating element including, in combination, a metal plate disposed adjacent the heating element, switch means disposed adjacent the metal plate, said switch means including a support secured to the metal plate, said switch means including a first switch arm and a second switch arm mounted by the support and adapted to be connected in the circuit of the heating element, said switch arms having cooperating contacts adapted for engagement to establish a circuit through the heating element, said switch arms lying in planes substantially normal to the plane of the metal plate, bracket means spaced from the switch means and joined with said metal plate, strut means of material having a coefficient of expansion less than the coefficient of expansion of the metal plate, said strut means being disposed between said bracket means and said second switch arm for transferring movement of said metal plate to said second switch arm upon expansion and contraction of the metal plate to change the relative position of said second switch arm, and manually operable means mounted by the support and engaging the first switch arm for varying the relative position of the first switch arm.

4. Control apparatus for an electrically energizable heating element including, in combination, a metal plate disposed adjacent the heating element, switch means disposed adjacent the metal plate, said switch means including a support secured to the metal plate, said switch means including a first switch arm and a second switch arm mounted by the support and adapted to be connected in the circuit of the heating element, said switch arms having cooperating contacts adapted for engagement to establish a circuit through the heating element, said switch arms lying in planes substantially normal to the plane of the metal plate, bracket means spaced from the switch means and joined with said metal plate, strut means of material having a coefficient of expansion less than the coefficient of expansion of the metal plate, abutment means adjustably mounted on the bracket means, said strut means being disposed between said abutment means and said second switch arm for transferring movements of said metal plate to said second switch arm upon expansion and contraction of the metal plate to change the relative position of said second switch arm, and manually operable means mounted by the support and engaging the first switch arm for varying the relative position of the first switch arm.

5. Control apparatus for an electrically energizable surface heating element for a cooking range wherein the heating element is shaped to define an open central area including, in combination, a metal plate disposed in the open central area of the heating element, switch means disposed adjacent the metal plate, spring means normally supporting said plate above the plane of the upper surface of the heating element, said switch means including a support secured to the metal plate, said switch means including a first switch arm and a second switch arm mounted by the support and connected in the circuit of the heating element, said switch arms being disposed in angular converging relation, the converging ends of the switch arms being provided with cooperating contacts for establishing a circuit through the heating element, a tensioning element mounted by said support engaging the second switch arm, an elongated strut means, means joined with said plate in engagement with one end of the strut means, the opposite end of the strut means engaging the tensioning element, said strut means having a coefficient of expansion less than that of the metal plate whereby expansion and contraction movement of said plate is transmitted by the strut means to the tensioning element for varying the relative position of said second switch arm, and manually operable means engaging the first switch arm for adjusting the relative position of said first switch arm.

6. Control apparatus for an electrically energizable surface heating unit for a cooking range wherein the heating unit is shaped to define an open central area, a circularly-shaped plate disposed in registration with the open central area, resilient means normally supporting said plate above the plane of the upper surface area of the heating unit, said plate being formed of metallic material and arranged to be engaged by and in heat transferring relation with a cooking receptacle adapted to be supported by the heating unit, switch means including first and second flexible switch arms, a first bracket means mounted by said plate at one peripheral region thereof, said switch arms being mounted by the bracket means, a flexible tensioning member mounted by the first bracket means engageable with the second switch arm, a second bracket means mounted by said plate at a position adjacent the peripheral region of the plate and diametrically opposite the first bracket means, strut means of a material of lesser coefficient of expansion than that of said plate, said strut means being disposed between and engaging said second bracket means and the switch arm tensioning member whereby expansion and contraction of said plate under temperature variations is transmitted to the tensioning member to vary the position of the second switch arm engaged thereby, and manually operable means mounted by the first bracket means and engaging the first switch arm for adjusting the relative position of said first switch arm.

7. Control apparatus for an electrically energizable surface heating unit for a cooking range including, in combination, a plate formed of metallic material disposed adjacent the surface heating unit and arranged to be engaged by and in heat transferring relation with a cooking receptacle adapted to be supported by the heating unit, switch means supported by said plate including first and second switch members provided with cooperating contacts arranged when in engagement to complete an energizing circuit for the heating unit, elongated strut means formed of material having a lesser coefficient of expansion than that of the plate, bracket means spaced from said switch means carried by said plate, an abutment member supported by said bracket means adapted to be engaged by one end of the elongated strut means, yieldable means mounted by said plate normally biasing said second switch member in a direction to disengage the contacts, the other end of the elongated strut means engaging the yieldable means whereby said strut means influences the position of the yieldable means to control the relative position of the second switch member upon expansion and contraction of the plate, and manually adjustable means mounted by said plate engaging the first switch member for controlling the relative position of the first switch member, said abutment member carried by the bracket means being adjustable for determining the initial position of said elongated strut means relative to said plate.

References Cited by the Examiner

UNITED STATES PATENTS

| | | | |
|---|---|---|---|
| 1,963,655 | 6/34 | Fichtner | 200—137 |
| 1,979,471 | 11/34 | Knopp | 200—137 |
| 2,154,043 | 4/39 | Gough | 200—137 |
| 2,306,979 | 12/42 | Potsdam | 219—37.01 |
| 2,537,808 | 1/51 | Bate | 219—25 |
| 2,820,129 | 1/58 | Long et al. | 219—37.01 |
| 2,888,548 | 5/59 | Knapp | 219—37.01 |
| 2,891,125 | 6/59 | Miller | 200—137 |

BERNARD A. GILHEANY, *Primary Examiner.*

RICHARD M. WOOD, ROBERT K. SCHAEFER, *Examiners.*